Sept. 20, 1966  B. McCOLLUM  3,274,544
METHOD OF DISTINGUISHING SEISMIC SIGNALS
Filed Oct. 21, 1963  5 Sheets-Sheet 1

INVENTOR.
Burton McCollum
BY Bertram H. Mann
ATTORNEY

Sept. 20, 1966  B. McCOLLUM  3,274,544
METHOD OF DISTINGUISHING SEISMIC SIGNALS
Filed Oct. 21, 1963  5 Sheets-Sheet 2

INVENTOR.
Burton McCollum
BY
Bertram N. Mann
ATTORNEY

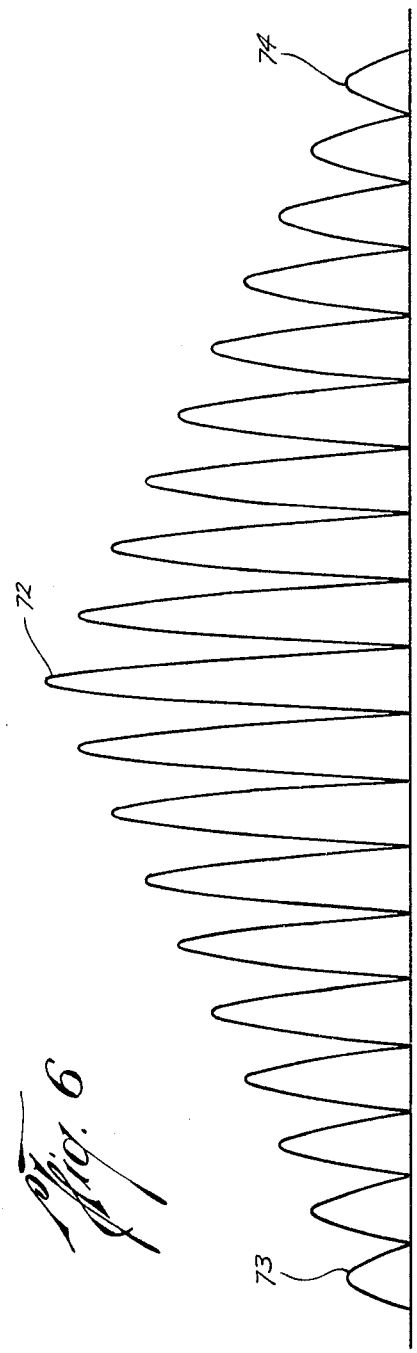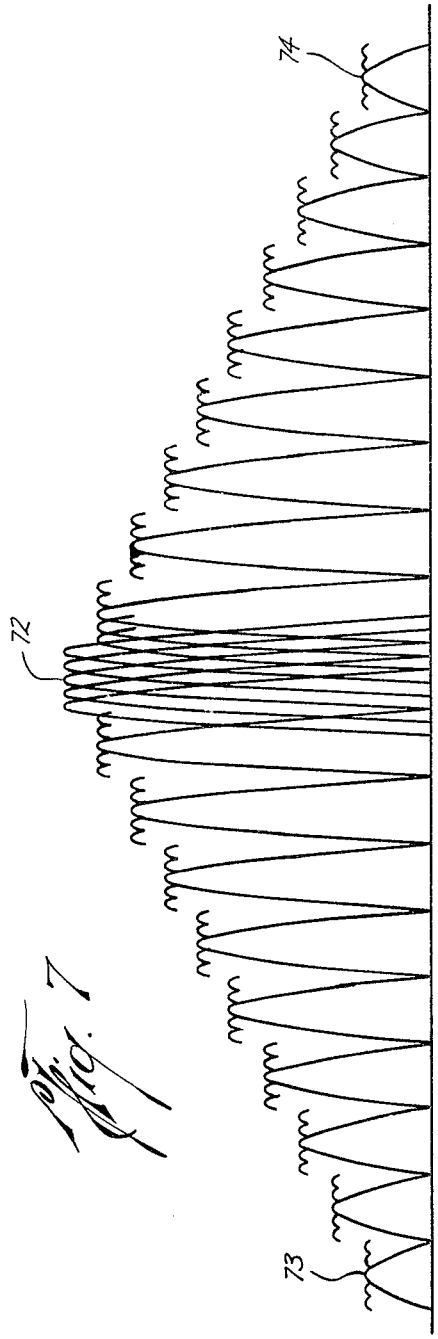

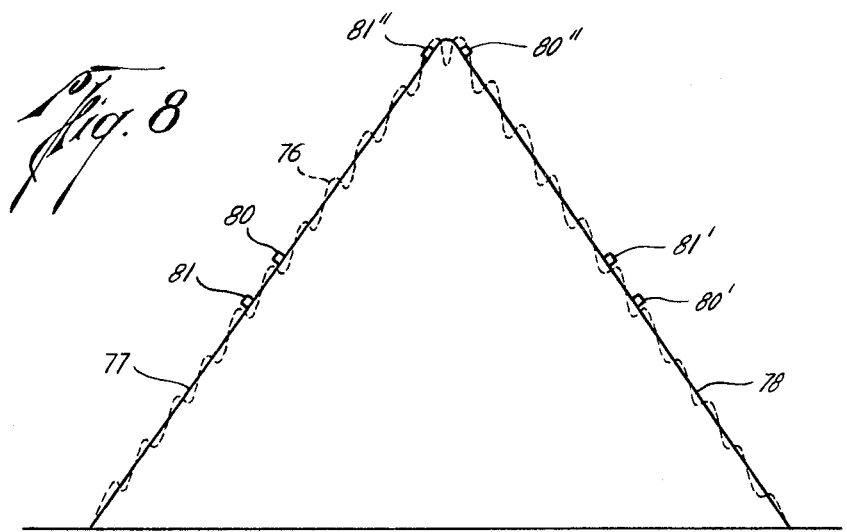
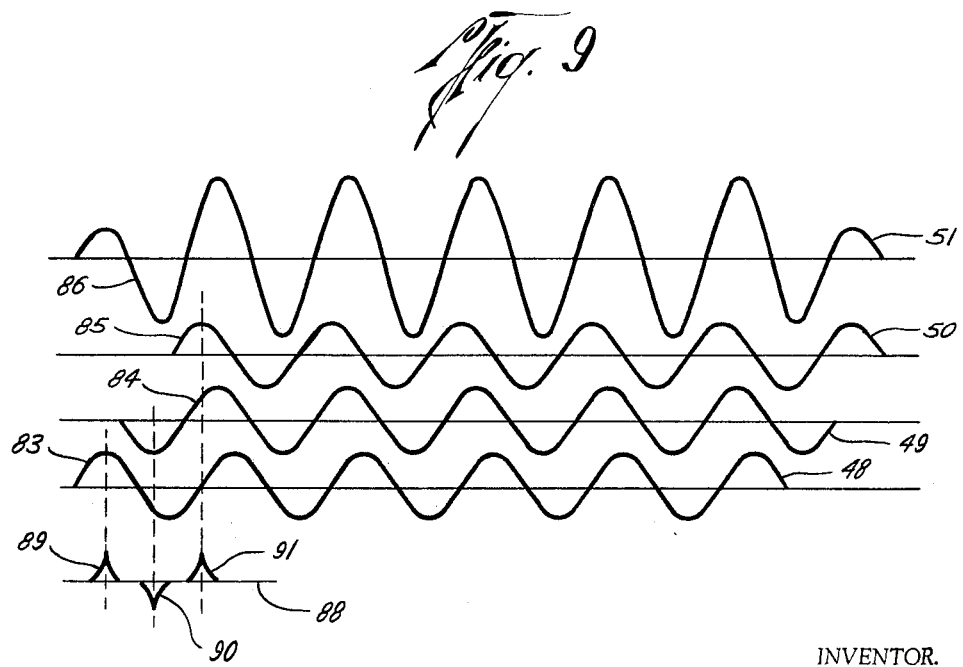

United States Patent Office 3,274,544
Patented Sept. 20, 1966

3,274,544
METHOD OF DISTINGUISHING SEISMIC SIGNALS
Burton McCollum, Houston, Tex.; P. R. Rowe and Bank of the Southwest National Association, Houston, Tex., executors of said Burton McCollum, deceased
Filed Oct. 21, 1963, Ser. No. 317,423
8 Claims. (Cl. 340—15.5)

This invention relates to seismic exploration and consists in novel methods of improving seismic records, particularly in emphasizing individual, overlapping signals and in reducing the noise to signal ratio.

In the art of exploring subsurface geology by means of the seismograph, one of the most severe limitations encountered is noise in the earth arising from natural causes. These natural noises are often of a magnitude much greater than the seismic signals and in such cases it is difficult or impossible to detect the desired signals. To meet this problem, certain measures have heretofore been used to reduce the amplitude of the noise components in relation to the signals. Conventional types of filters are commonly used for this purpose, and are effective to a degree, but they often fall far short of what is needed. One reason for this is that such filters can discriminate only against unwanted frequencies, and are incapable of distinguishing between signals and noise of substantially the same frequency. In practice, it often happens that noise in the frequency range close to the signal frequencies is of greater magnitude than the signals, thus making it impossible to distinguish the wanted signals on the record by frequency discrimination alone.

In order to meet this situation it is necessary to provide means for minimizing noise regardless of its frequency characteristics. Heretofore, attempts to meet this problem have depended largely on the well-known principle of elgebraic summation or integration of a plurality of reflections of the same signal or of repeated signals. This principle as usually employed is of substantial value, but in many areas it is inadequate to meet practical requirements.

Another problem in seismic exploration is that reflections from closely spaced horizons often appears on the record in confused overlapping condition so that the positioning of the horizons can not be clearly discerned. This condition is aggravated where the wave length of the signal is made long enough to minimize absorption to any adequate degree.

Accordingly, an object of the present invention is to provide novel means for emphasizing wanted reflections on a seismic record in relation to unwanted wave energy.

Another object is to provide a novel method for clarifying the positioning of overlapping signals on a seismic record.

Still another object is to provide a novel method of processing a seismic signal so as to reduce each reflected signal to a brief marker and thus reduce or avoid the problem of overlap due, for instance, to arrival at the seismograph of reflections from closely associated horizons.

According to one form of my present invention, one or more elastic wave train signals of fixed frequency, amplitude, and duration are radiated in the earth. The signal energy and accompanying wave energy are detected, as by a seismograph, after travel through the earth in the usual manner and the detected voltage function is thereafter made into multiple, side-by-side preliminary recordings by means of a plurality of recording heads which are sequentially advanced a distance equal to one half wave length of the signal, alternate records being phase reversed or inverted. A first composite record is made through aligned heads which will show a prominence coincidentally with the beginning of each different signal reflection.

If the prominences are not sufficiently brief and clear to mark the reflected events, the derived record may be further processed by converting the detected function into voltage peak gradients as by rectification, frequency multiplication, and low pass filtration procedures, playing back the resulting voltage envelope by means of a pair of closely spaced heads wired to reflect the first derivative of the function recorded but at opposite polarity, and making a final composite record from the latter pair of heads. In the final record, the signal will disappear while the pair of heads are upon the same slope and a brief marker will appear during the brief interval while the heads are on opposite slopes. This process will have the effect of reducing overlapping wave train reflections from the signal to brief, clearly differentiated markers in a very desirable manner.

In the accompanying drawings which illustrate the invention,

FIGS. 6, 7 and 8 schematically illustrate further process techniques; and

FIG. 9 illustrates a final form of record which results from the novel processing techniques herein described and also illustrates overlapping signals which may be processed by these techniques.

Figure 1:
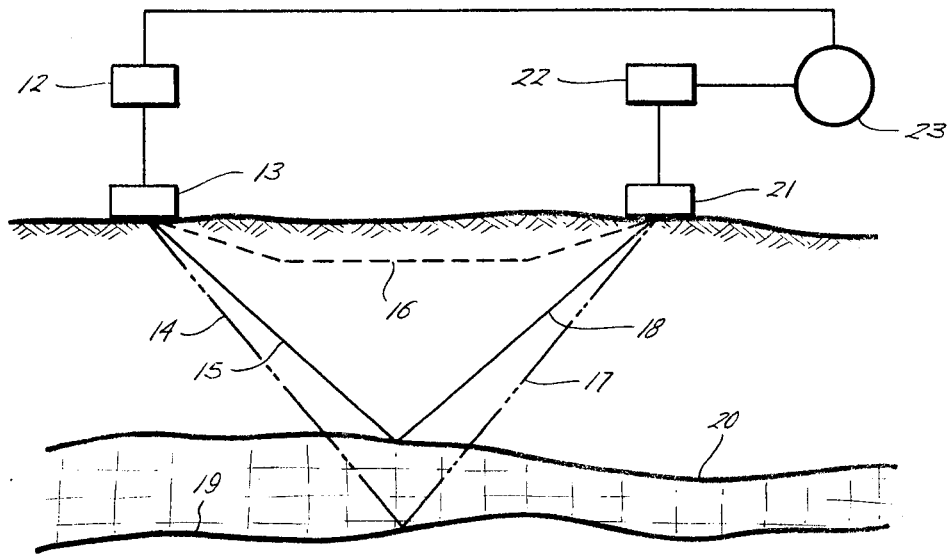
FIG. 1 is a schematic representation of important equipment and wave paths utilized in seismic exploration.

FIG. 1 illustrates equipment typically used in seismic work and phenomena incident thereto, including powering equipment 12 electrically connected to a radiator 13 conveniently as disclosed in my co-pending application Serial No. 257,457, filed February 2, 1963, for propogating in the earth precisely controlled, truncated wave trains, indicated at 14, 15 and 16, of uniform wave length and amplitude. The radiated wave trains are of adequate wave length to minimize absorption to meet practical requirements. Wave train signals 14 and 15 are indicated as reflected, at 17 and 18 from horizons 19 and 20 and detected by a seismograph 21. Other refracted and noise energy, also, will be received by the seismograph, as at 16 and all detected wave energy will be converted to electrical current and transmitted to filtering and other processing equipment as will be described and generally designated 22. The processed current, then, will be recorded, as by a cyclical magnetic recorder 23 synchronously coupled to the radiator powering apparatus 12.

Figure 2:
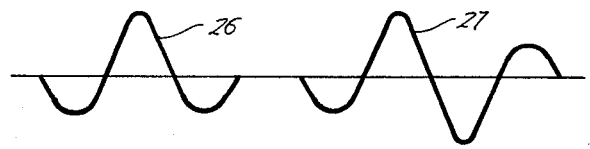
FIG. 2 illustrates typical seismic events commonly used in practice.

To illustrate the principle involved in my invention, reference is first made to FIG. 2 which illustrates the more common features that characterize conventional seismic signals. A typical signal, usually, is generated by some sort of pulse technique, such as by the use of a charge of explosive or by the dropping of a weight. Signals generated by these means will have the general characteristics illustrated as 26 and 27 which are typical forms. It will be seen that there is a lack of regular geometrical form, that the successive half waves are dissimilar both as to amplitude and duration, and that the number of half waves varies. These variations result largely from the fact that the form and character of signals generated by conventional pulse techniques are determined in large measure by the characteristics of the earth in the immediate vicinity of the point at which the pulse is generated. These earth characteritsics normally vary greatly from point-to-point due to such factors as the character of the soil, the depth of the weathered layer, the water content of the soil, and the presence or absence of vegetation. These variable details of record character are therefore largely similar to those of random noise.

Figure 3:
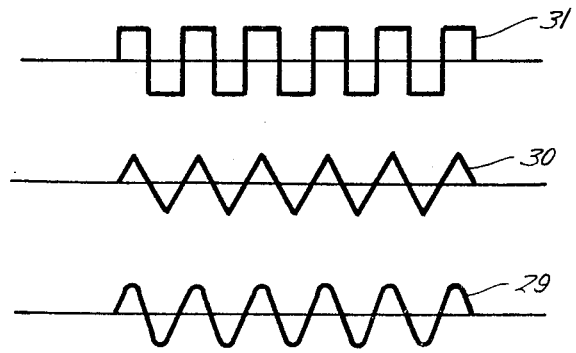
FIG. 3 illustrates several types of seismic signals which are particularly suited for use in connection with my invention.

According to my present invention I radiate a special type of signal, the simplest form of which is shown at 29 in FIG. 3. This signal takes the form of a truncated wave train, sinusoidal in form, in which the frequency, amplitude, and number of wave lengths are predetermined. The number of wave lengths used may vary widely, depending chiefly on the magnitude of the problem presented by the noise. In general, the lower the signal-noise ratio, the greater the number of wave lengths that will be required. Other wave forms characterized by a fixed frequency, definite number of wave lengths, and uniform amplitude from beginning to end and, preferably, containing no even harmonics, so that the positive and the negative half waves will be identical, are shown at 30 and 31. Effective apparatus for generating such waves is illustrated in my above-mentioned co-pending application.

Reflections of the signal are recorded and repeated a plurality of times with progressive displacements in time of substantially one half wave length and with alternate shifted records reversed in phase. A composite of all such shifted records is then made. This shifting can be accomplished in a number of ways, as by the use of electrical delay circuits or by recording the displaced records side by side and playing them back through aligned playback heads. The following illustrative description is based on the latter technique. The signal is recorded on side-by-side tracks, as illustrated at 33–43, inclusive, in FIG. 4, by means of a plurality of recording heads 45–55, inclusive. These heads and the playback and rerecording heads hereafter mentioned preferably are incorporated in a bias modulation magnetic recording system of the type conventionally used in seismic exploration work. In such systems, the polyback heads reflect the changes in flux of the record trace scanned, i.e., the first derivative of the flux strength. Also, such systems can be wired so that the phasing of a record or voltage function played back can be reversed for rerecording. Assuming that the recording drum is traveling rightwardly, as indicated by the arrow 56, the recording heads will be serially advanced each a distance equal to one half the wave length of the signal. The same number of recording heads are provided as the number of half waves in the truncated wave train which constitutes the radiated signal, in this case, 11. The heads, or rather their outputs as explained above, are alternately opposite in polarity so that aligned half waves will appear in phase. Thus, the recorded traces will spread out as in FIG. 4 wherein the detected voltage function is indicated as sinusoidal for simplicity. Actually, the detected function will be a mixture of overlapping reflections, refractions, and noise.

Figure 4:
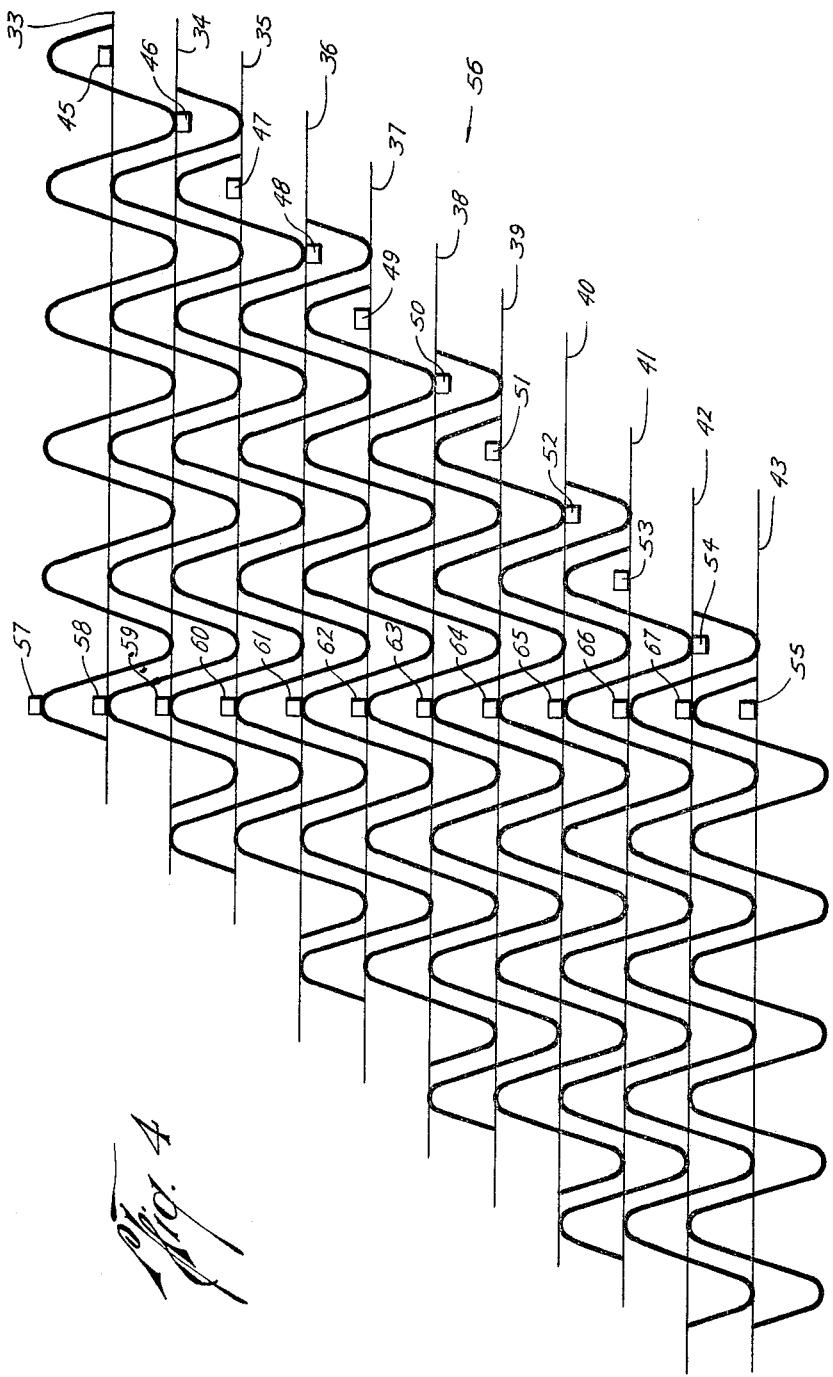
FIG. 4 illustrates a first procedural step in accordance with my invention.

Next, a group of playback heads 57–67, inclusive, are placed in line perpendicular to the direction of record movement, i.e., axially, and each, of course, associated with one of the record tracks, so as to play back the instantaneous algebraic sum of the eleven records. This playback produces a composite record as illustrated at 69 in FIG. 5, where only a single reflected event is involved. Any half wave of this derived function is the sum of a certain number of half waves of the overlapped original signals, as in FIG. 4, plus any noise associated with such half waves. Accordingly, this compositing step results in the vertical stacking in the central half wave 70 (FIG. 5) of all of the components of both signal and noise that exist in the reproduced aligned half waves of the original signal. Since, in the case here considered, the number of half waves in the signal, as recorded in FIG. 4, is 11, the amplitude of the half wave 70 (FIG. 5) will be eleven times the amplitude of the individual signal component. Since the noise components of the aligned half waves are random as to both amplitude and phase, there will be a tendency toward self-cancellation of the noise elements. The peak half wave 70 of FIG. 5, therefore, will have, in general, not only a much greater amplitude, but also a higher signal-noise ratio than the original signal event. It will be noted that the prominent central half wave 70 not only is the most conspicuous part of the derived event 69, but also coincides in time with the initial half wave of the original signal. It therefore marks the time of arrival of a particular reflection of the original signal much more clearly than the original record itself. The other half waves forward and rearwardly from the dominant half wave 70 are of progressively reduced amplitude in both direction therefrom. In actual practice, usually there will appear multiple overlapping reflections so that several voltage or amplitude crests will appear spaced apart an amount equal to the travel time between the reflecting horizons.

Figure 5:
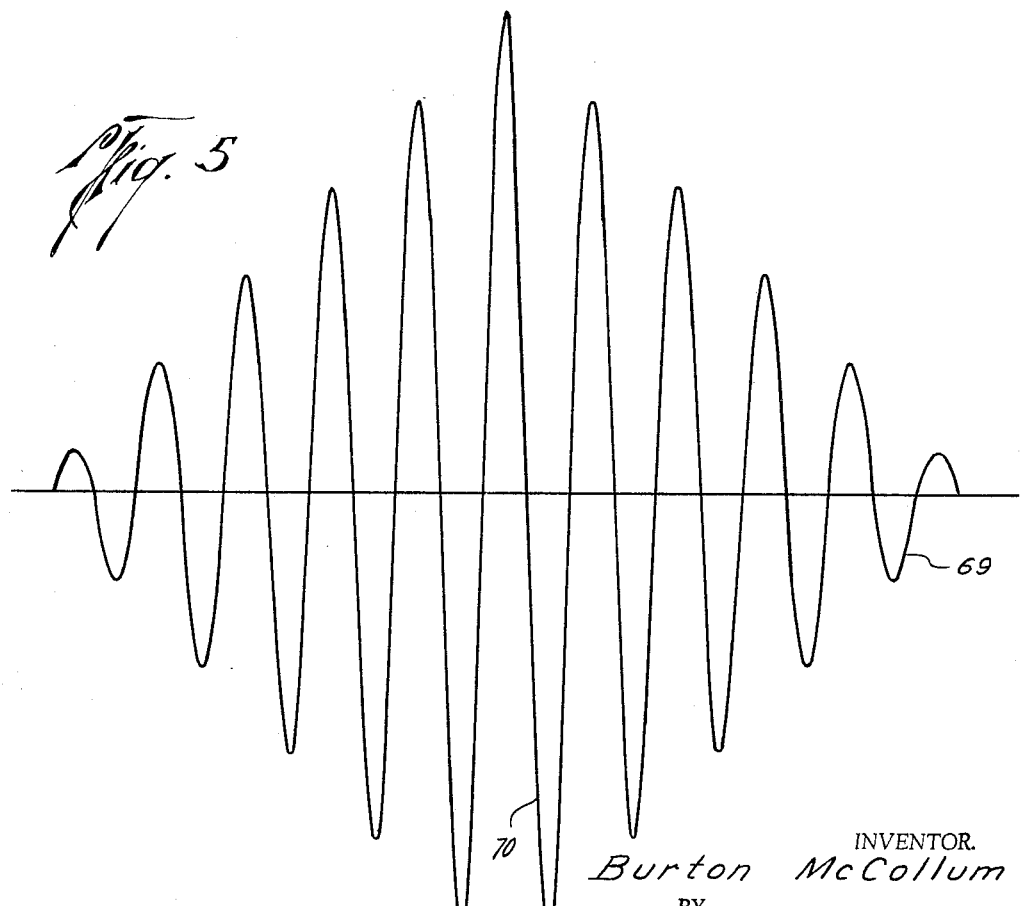
FIG. 5 illustrates the type of record resulting from the procedure illustrated and described in connection with FIG. 4.

Under some conditions in practice a record reflecting the derived function of FIG. 5 is satisfactory for purposes of interpretation. This is particularly true in cases in which there is very little noise and the reflecting horizons are spaced apart far enough so that the reflected events do not overlap. In many important practical cases, however, there will be overlap which will give rise to confusion and misinterpretation, and this difficulty is multiplied as the duration of the reflected events is increased. In order to achieve clarity and accuracy of interpretation of the primary record, the duration of the reflected events should be made as short as possible. However, the important objective of bringing out the signals in the presence of noise is much more effectively accomplished by the use of long wave trains. Therefore, it is a matter of prime importance that these two conflicting factors be reconciled.

To further improve the record, the derived function of FIG. 5 is next played back and subjected to full wave rectification which produces a function and record as illustrated in FIG. 6 with doubled wave peaks. This derived function is still not suitable for our purpose because of the great fluctuation in amplitude between successive rectified half waves adjacent the voltage salients, as 72. To eliminate this condition the function of FIG. 6 is recorded and then played back and re-recorded a number of times, as indicated in FIG. 7, each time with a slight shift of a fraction of a half wave length. Preferably, equal numbers of shifts are in opposite directions from the center point, in other words, respectively earlier and later or advanced and retarded, so that the mean time shift will be virtually zero. FIG. 7 shows the function of FIG. 6 exactly reproduced and then shifted twice in each direction from the midposition, only the crests of the waves being illustrated, except at the midportion of the record. This results in a record which is a composite of the several components illustrated in FIG. 7 which approaches the voltage crest envelope shown in dotted line 76 in FIG. 8. This function is then subjected to a small amount of low pass conventional filtering to produce straight line functions 77 and 78, intersecting at the voltage peaks and representative of voltage gradients.

The record of the derived function 77, 78 is now played back through two playback heads, as 80 and 81, spaced apart by one half wave length of the original signal, the heads being connected in reversed polarity, as explained. The playback is made in such a manner that the voltage output of each head 80 and 81 is the first derivative of the function 77 or 78, in other words, reflects the slope thereof. If the recording is made by a bias modulation system, that relationship will automatically exist, but if frequency modulation be used, appropriate and obvious modifications in the form of a conventional differentiating circuit will be required. Thus, when the two heads are both playing back on the same slope at the positions 80 and 81 or at positions 80' and 81', the output of the two heads will be equal in magnitude, but opposed in sense so that the resultant will be zero. This is because the first derivative or slope of a straight line will be constant.

However, during the brief period when one of the playback heads is on each slope, as indicated at 80" and 81", the first derivatives of the voltages in the two heads will be cumulative and the resultant output suddenly will become large. This large value of voltage output occurs at a time coincident with the first half wave of the most advanced detected signal event. Therefore, it is recorded as a desired brief marker clearly indicating the presence and positioning of the beginning of the original signal.

The end result of the continued processing above described is illustrated in FIG. 9, wherein actual signal reflections are represented at 83, 84 and 85 in extensively overlapping relationship. The composite function or record of the original reflected signals is represented at 86. This composite is a single long event without sufficient character to disclose either the number or relative positions of the reflecting horizons from which they are derived. The intermediate composites of FIGS. 5 and 6 and the envelope of FIG. 8 will appear with a maximum peak representing the beginning of each detected reflection. However, after processing as described above, the final record will have the character of the track 88 of FIG. 9. Here the brief markers 89, 90, and 91 replace the original signals, and because of their brevity, they reveal with great clarity the number and precise time of arrival of the several reflected events 83, 84 and 85.

The invention may be modified in various respects as will occur to those skilled in the art, and the exclusive use of all modifications as come within the scope of the appended claims is contemplated.

I claim:

1. The method of seismic exploration comprising radiating in the earth a truncated wave train signal of constant frequency and amplitude and predetermined number of cycles, detecting a subsurface reflection of said signal and accompanying wave energy, repeating the detected signal reflection and associated wave energy a number of times equal to the number of half cycles in said signal, and making an algebraically composited record of the repeated reflection and wave energy progressively shifted in phase a half wave length of the signal and alternately reversed in phase for emphasizing the beginning of the reflected wave energy on the composite record.

2. The method of seismic exploration described in claim 1 in which said accompanying wave energy includes at least one additional subsurface reflection of the signal, the composited record reflecting an energy amplitude salient synchronized with the beginning of each signal reflection on the composited record.

3. The method of seismic exploration described in claim 1 in which said signal reflection and accompanying wave energy are preliminarily recorded individually the number of times equal to the number of half cycles in the signal, the preliminary records being played back and mixed with the playback heads shifted successively a half wave length and alternate playbacks reversed in phase.

4. The method of seismic exploration described in claim 3 in which said preliminary records are formed side by side on a cyclically moving recording medium and successively shifted a half wave length, the playback being effected by means of heads disposed in line axially across said medium.

5. The method of seismic exploration described in claim 1 including the further steps of translating the detected energy function to a voltage function, multiplying the frequency of the voltage function by a whole number, making a composite record of the repeated voltage functions, subjecting the resultant composite to low pass filtration so as to produce relatively smooth voltage gradients culminating in crests corresponding to the beginnings of overlapping signal reflections, playing back said voltage gradients by means of a pair of adjacent serial playback heads wired so that their outputs reflect the first derivative of the record function and reversed in polarity whereby the outputs of said heads will cancel each other when both heads are on a single voltage gradient slope and will be cumulative when the heads are on opposite slopes, and recording the pulses resultant from the mixed outputs of said heads.

6. The method of seismic exploration described in claim 5 including the further step of re-recording said last-mentioned composite record a plurality of times successively shifted in time a small proportion of the signal wave length prior to the low pass filtration step for additionally smoothing the recorded voltage gradients.

7. The method of seismic exploration described in claim 5 including the further step of repeating the signal radiation, subjecting detected signal reflections from each radiation at substantially the same pick-up point to the processing steps described in claim 14 and subjecting the resultant pulses to cross-correlation for eliminating random events.

8. The method of seismic exploration comprising radiating in the earth a truncated wave train signal of constant frequency and amplitude and predetermined number of cycles, detecting reflections of said signal and accompanying wave energy and translating the detected energy to a voltage function, repeating the detected voltage function on a first composite record with the repetitions successively shifted a half wave length of the signal and alternate repetitions reversed in phase to produce in said first composite amplitude salients corresponding with the beginnings of detected signal reflections, playing back said first composite record by means of playback heads wired to reflect the first derivative of the played back record, and producing a second composite record from the outputs of said heads by means of a recording head related to said playback heads so that the outputs of said playback heads will be respectively opposite in phase whereby said outputs will cancel each other when both of said playback heads are on the same slope and will be cumulative to produce an output pulse only when said heads are on opposite slopes.

References Cited by the Examiner
UNITED STATES PATENTS

| | | | |
|---|---|---|---|
| 2,450,352 | 9/1948 | Piety | 340—15.5 |
| 2,634,398 | 4/1953 | Piety | 340—15.5 |
| 2,795,287 | 6/1957 | Sharpe | 340—15.5 |
| 2,989,135 | 6/1961 | Pierce et al. | 340—15.5 |
| 2,991,447 | 7/1961 | Winterhalter et al. | 340—15.5 |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,274,544            September 20, 1966

Burton McCollum

It is hereby certified that error appears in the above numbered patent requiring correction and that the said Letters Patent should read as corrected below.

Column 1, line 42, for "appears" read -- appear --; column 3, line 41, for "polyback" read -- playback --; column 6, line 30, for "14" read -- 5 --.

Signed and sealed this 29th day of August 1967.

(SEAL)
Attest:

ERNEST W. SWIDER
Attesting Officer

EDWARD J. BRENNER
Commissioner of Patents